(12) United States Patent
Shirabe et al.

(10) Patent No.: US 11,036,895 B2
(45) Date of Patent: Jun. 15, 2021

(54) INFORMATION PROCESSING APPARATUS FOR DETERMINING A HEAT RESERVOIR IN A MOLDING PROCESS

(71) Applicant: FUJI XEROX CO., LTD., Tokyo (JP)

(72) Inventors: Yoshitomo Shirabe, Kanagawa (JP); Yasuaki Yamakawa, Kanagawa (JP); Masanori Yoshizuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 558 days.

(21) Appl. No.: 15/954,606

(22) Filed: Apr. 17, 2018

(65) Prior Publication Data

US 2019/0034559 A1 Jan. 31, 2019

(30) Foreign Application Priority Data

Jul. 28, 2017 (JP) .............................. JP2017-146017

(51) Int. Cl.
| | | |
|---|---|---|
| *G06F 30/00* | (2020.01) | |
| *G06F 30/17* | (2020.01) | |
| *G06F 30/20* | (2020.01) | |
| *G06F 111/02* | (2020.01) | |
| *G06F 113/22* | (2020.01) | |
| *G06F 119/08* | (2020.01) | |

(52) U.S. Cl.
CPC .............. *G06F 30/00* (2020.01); *G06F 30/17* (2020.01); *G06F 30/20* (2020.01); *G06F 2111/02* (2020.01); *G06F 2113/22* (2020.01); *G06F 2119/08* (2020.01)

(58) Field of Classification Search
CPC .......... G06F 30/00; G06F 30/17; G06F 30/20; G06F 2111/02; G06F 2113/22; G06F 2119/08
See application file for complete search history.

(56) References Cited

U.S. PATENT DOCUMENTS

| | | | |
|---|---|---|---|
| 2016/0167295 A1* | 6/2016 | Wang ...................... | G06F 30/20 264/40.1 |
| 2017/0160726 A1* | 6/2017 | Rameau .................. | G06F 30/17 |

FOREIGN PATENT DOCUMENTS

| | | |
|---|---|---|
| JP | H04-334419 | 11/1992 |
| JP | 2000-190371 | 7/2000 |

OTHER PUBLICATIONS

Xu et al. "Recognition of rough machining features in 2 1/2 D components". Computer-Aided Design, vol. 30, No. 7, pp. 503-516, 1998. (Year: 1998).*
Martin et al. "A CAD/CAE-integrated injection mold design system for plastic products". Int J Adv Manuf Technol (2012) 63: pp. 596-607. (Year: 2012).*
Sunil et al. ("Automatic recognition of features from freeform surface CAD models". Computer-Aided Design 40 (2008) 502-517. (Year: 2008).*

* cited by examiner

*Primary Examiner* — Eunhee Kim

(74) *Attorney, Agent, or Firm* — Volpe Koenig

(57) ABSTRACT

An information processing apparatus includes a first extraction unit and a second extraction unit. The first extraction unit extracts a pouch-shaped portion from drawing information on a mold. The second extraction unit extracts a site from which heat is not easily released from the pouch-shaped portion.

6 Claims, 9 Drawing Sheets

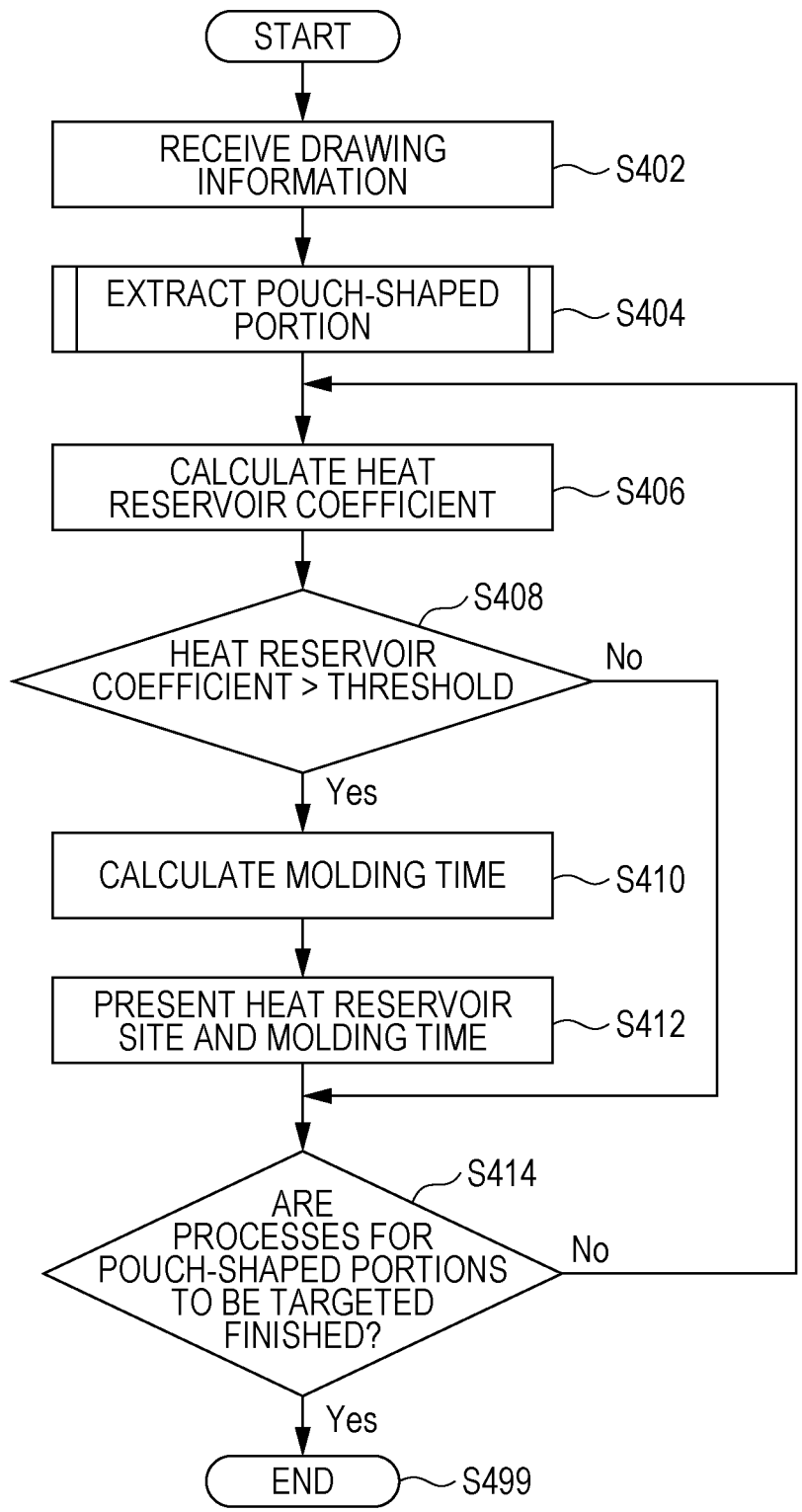

INFORMATION PROCESSING APPARATUS FOR DETERMINING A HEAT RESERVOIR IN A MOLDING PROCESS

CROSS-REFERENCE TO RELATED APPLICATIONS

This application is based on and claims priority under 35 USC 119 from Japanese Patent Application No. 2017-146017 filed Jul. 28, 2017.

BACKGROUND

Technical Field

The present invention relates to an information processing apparatus.

SUMMARY

According to an aspect of the present invention, there is provided an information processing apparatus including: a first extraction unit that extracts a pouch-shaped portion from drawing information on a mold; and a second extraction unit that extracts a site from which heat is not easily released from the pouch-shaped portion.

BRIEF DESCRIPTION OF THE DRAWINGS

An exemplary embodiment of the present invention will be described in detail based on the following figures, wherein:

FIG. 4 is a flowchart illustrating a process example according to the exemplary embodiment;

DETAILED DESCRIPTION

A preferable exemplary embodiment for implementing the present invention will be described below with reference to the drawings.

Figure 1:
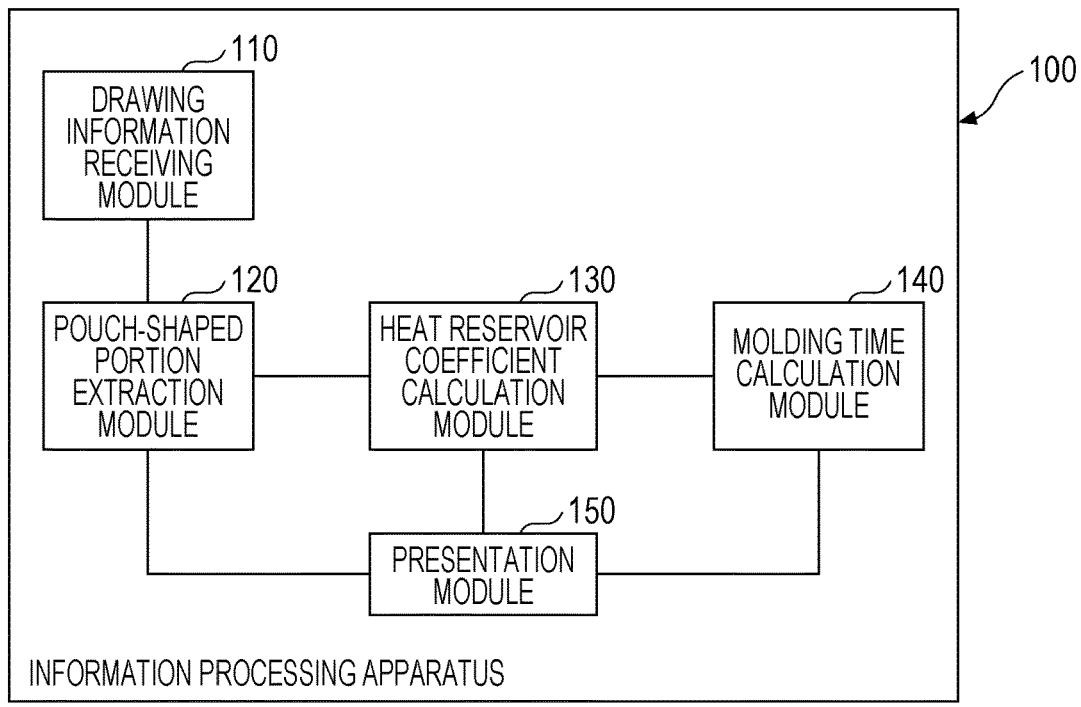
FIG. 1 is a conceptual module configuration diagram illustrating a configuration example according to an exemplary embodiment.

FIG. 1 is a conceptual module configuration diagram illustrating a configuration example according to an exemplary embodiment.

The term "module" generally refers to parts such as software (computer program) and hardware that are logically separable from each other. Thus, the modules in the exemplary embodiment include not only modules based on computer programs but also modules based on hardware components. Therefore, the exemplary embodiment also describes a computer program for causing a computer to function as such modules (a program for causing a computer to execute such procedures, a program for causing a computer to function as such units, and a program for causing a computer to implement such functions), a system, and a method. It should be noted, however, that language "store" and "cause . . . to store" and equivalent language is used for convenience of description. In the case where the exemplary embodiment describes a computer program, however, such language means to "cause a storage device to store" or "perform control so as to cause a storage device to store". In addition, the modules may make one-to-one correspondence with the functions. In implementation, however, one module may be constituted of one program, plural modules may be constituted of one program, or conversely one module may be constituted of plural programs. In addition, plural modules may be executed by one computer, or one module may be executed by plural distributed or parallel computers. One module may include another module. In the following description, in addition, the term "connection" is used to indicate not only physical connections but also logical connections (for data exchange, instruction, data reference, etc.). The term "predetermined" means that the modificand has been determined before the target process, and may be used to mean that the modificand is determined in accordance with the situation or the state at the time, or the situation or the state in the past, before the target process even after the process according to the exemplary embodiment is started, not to mention before the process according to the exemplary embodiment is started. In the case where there are plural "predetermined values", such values may be different from each other, or two or more (or all, as a matter of course) of such values may be the same as each other. In addition, the wording "in the case where A, then B" is used to mean "it is determined whether or not A, and in the case where it is determined that A, then B". It should be noted, however, that cases where it is not necessary to determine whether or not A are excluded. In the case where elements are listed as in "A, B, and C", such listing is exemplary unless stated otherwise, and includes a case where only one of the elements (e.g. A alone) is selected.

In addition, the system or the device may be constituted of plural computers, hardware, devices, etc. connected by a communication unit such as a network (including a one-to-one communication connection), or may be implemented by one computer, hardware, device, etc. The terms "device" and "system" are used as synonyms for each other. As a matter of course, the term "system" does not include mere social "schemes" (social systems) which are artificial arrangements.

In addition, after each process performed by each module, or after each of plural processes performed in a module, target information is read from a storage device, and the result of the process is written into the storage device after the process is performed. Thus, reading from the storage device before the process and writing into the storage device after the process may not be described. Examples of the storage device may include a hard disk, a random access memory (RAM), an external storage medium, a storage device via a communication line, and a register in a central processing unit (CPU).

An information processing apparatus 100 according to the present exemplary embodiment extracts a site from which heat is not easily released from drawing information on a mold, and includes, as illustrated in the example of FIG. 1, a drawing information receiving module 110, a pouch-shaped portion extraction module 120, a heat reservoir coefficient calculation module 130, a molding time calculation module 140, and a presentation module 150.

A mold (die) is used to manufacture a plastic part (molded article), for example. There is a site from which heat received from the plastic part is not easily released to cause extension of a molding cycle (extension of a molding time). Such a site is referred to as a "heat reservoir".

It is highly possible that a pouch-shaped portion serves as the heat reservoir. This is because the mold has only one surface to be cooled. It should be noted, however, that all pouch-shaped portions do not serve as heat reservoirs. This is because a long molding time is not required for shallow pouch-shaped portions, pouch-shaped portions molded using a mold that has a surface to be cooled with a large area, etc. Thus, it is difficult for humans to detect a heat reservoir.

Thus, the information processing apparatus 100 extracts a heat reservoir from drawing information on a die.

The drawing information receiving module 110 is connected to the pouch-shaped portion extraction module 120. The drawing information receiving module 110 receives drawing information on a mold for computer-aided design (CAD) or the like. The term "drawing information" refers to information that indicates a three-dimensional shape. To receive drawing information includes receiving drawing information generated by an operation (design work) by a user such as a designer, reading drawing information stored in a hard disk (built in a computer, connected via a network, or the like), and so forth. The drawing information to be received may be information about one drawing, or may be information about plural drawings.

The pouch-shaped portion extraction module 120 is connected to the drawing information receiving module 110, the heat reservoir coefficient calculation module 130, and the presentation module 150. The pouch-shaped portion extraction module 120 extracts a pouch-shaped portion from the drawing information on a mold which is received by the drawing information receiving module 110.

The pouch-shaped portion extraction module 120 may perform different processes in accordance with whether or not an adjacent surface that is adjacent to a bottom surface is a flat surface.

In the case where the adjacent surface is a flat surface, further, the pouch-shaped portion extraction module 120 may extract a surface that makes an angle of 180 degrees or less with the adjacent surface as the bottom surface, and extract a portion formed by the bottom surface and the adjacent surface as a pouch-shaped portion.

In the case where the adjacent surface is not a flat surface, meanwhile, the pouch-shaped portion extraction module 120 may extract a pouch-shaped portion using the distance between a point on the boundary between the bottom surface and the adjacent surface and a point on the boundary with the adjacent surface which is located in the opposite direction from the bottom surface. Examples of the case where the adjacent surface is "not a flat surface" include a case where the adjacent surface is a curved surface.

The heat reservoir coefficient calculation module 130 is connected to the pouch-shaped portion extraction module 120, the molding time calculation module 140, and the presentation module 150. The heat reservoir coefficient calculation module 130 extracts a site from which heat is not easily released from the pouch-shaped portion which is extracted by the pouch-shaped portion extraction module 120. The "site from which heat is not easily released" is also called a "heat reservoir", and refers to a site in which heat is accumulated to cause extension of the time for molding.

The heat reservoir coefficient calculation module 130 may extract a site from which heat is not easily released on the basis of a coefficient calculated using (1) the sectional area of the pouch-shaped portion and the area of the adjacent surface, or (2) the sectional area of the pouch-shaped portion and the volume of the pouch-shaped portion. The "coefficient" is a value that indicates the difficulty of heat release. Examples of the phrase "on the basis of a coefficient" include "by comparison between the coefficient and a predetermined threshold". That is, the pouch-shaped portion is determined to be a heat reservoir in the case where the calculated coefficient is equal to or more than the predetermined threshold, and the pouch-shaped portion is determined not to be a heat reservoir in the case where the calculated coefficient is not equal to or more than the predetermined threshold.

The "sectional area" may be the area of a sectional surface of the pouch-shaped portion that is perpendicular to the draft direction at a predetermined height. Examples of the "predetermined height" include the minimum height of the pouch-shaped portion.

The molding time calculation module 140 is connected to the heat reservoir coefficient calculation module 130 and the presentation module 150. The molding time calculation module 140 may calculate a molding time. The "molding time" may be a value calculated using a coefficient calculated using the sectional area of the pouch-shaped portion and the area of the adjacent surface, or the sectional area of the pouch-shaped portion and the volume of the pouch-shaped portion. The "molding time" may be calculated from the coefficient discussed earlier. For example, a formula that includes the coefficient as a variable (parameter) may be used, or a table in which the coefficient is correlated with the molding time may be used.

The presentation module 150 is connected to the pouch-shaped portion extraction module 120, the heat reservoir coefficient calculation module 130, and the molding time calculation module 140. The presentation module 150 may present the site from which heat is not easily released or the molding time as a result of the process which is performed by the heat reservoir coefficient calculation module 130 or the molding time calculation module 140. The "presenting" may include "displaying on a display device such as a liquid crystal display" and "outputting as a three-dimensional image", which may be combined with "printing using a printing device such as a printer", "outputting a sound using a sound output device such as a speaker", "vibration", etc. For example, when displaying a mold, the site from which heat is not easily released may be displayed in a color (e.g. a red color) that is different from colors for other portions.

Figure 2:
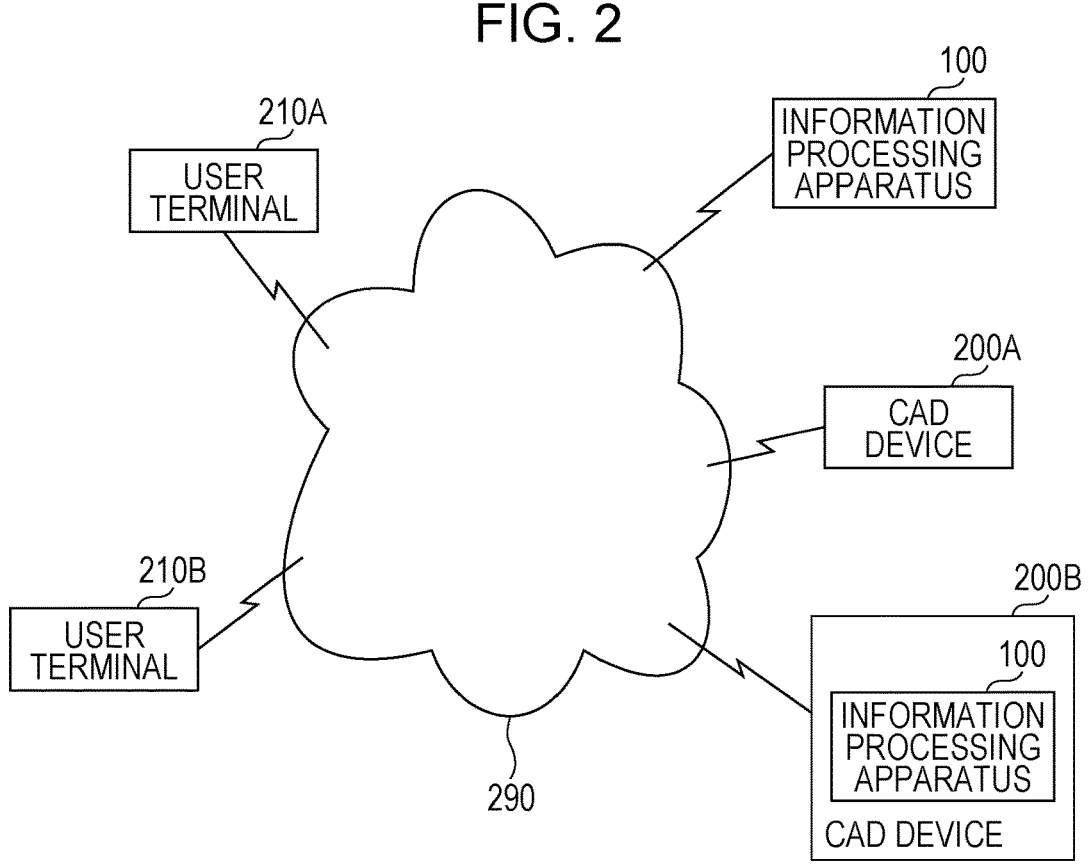
FIG. 2 illustrates a system configuration example that utilizes the exemplary embodiment.

FIG. 2 illustrates a system configuration example that utilizes the exemplary embodiment.

A CAD device 200B includes the information processing apparatus 100. The information processing apparatus 100, a CAD device 200A, the CAD device 200B, a user terminal 210A, and a user terminal 210B are connected to each other via a communication line 290. The communication line 290 may be wireless, wired, or a combination of both, and may be the Internet, an intranet, etc. that serves as a communication infrastructure, for example. The functions of the information processing apparatus 100 and the CAD device 200 may be implemented as cloud services.

For example, the user as the designer prepares a design drawing of a mold utilizing the CAD device 200 via the user terminal 210A. Drawing information as the design drawing is stored in the CAD device 200. A manager of a design group makes an estimation of the molding time for the designed mold utilizing the information processing apparatus 100 via the user terminal 210B. The information processing apparatus 100 takes out the drawing information in the CAD device 200, extracts a heat reservoir site, makes an estimation of the molding time, and presents the heat reservoir site and the estimation result to the manager.

Figure 3A:
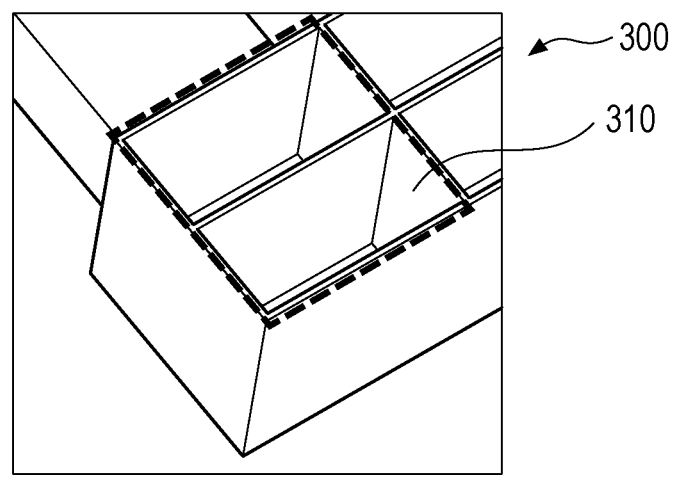
FIGS. 3A and 3B illustrate a process example according to the exemplary embodiment.
Figure 3B:
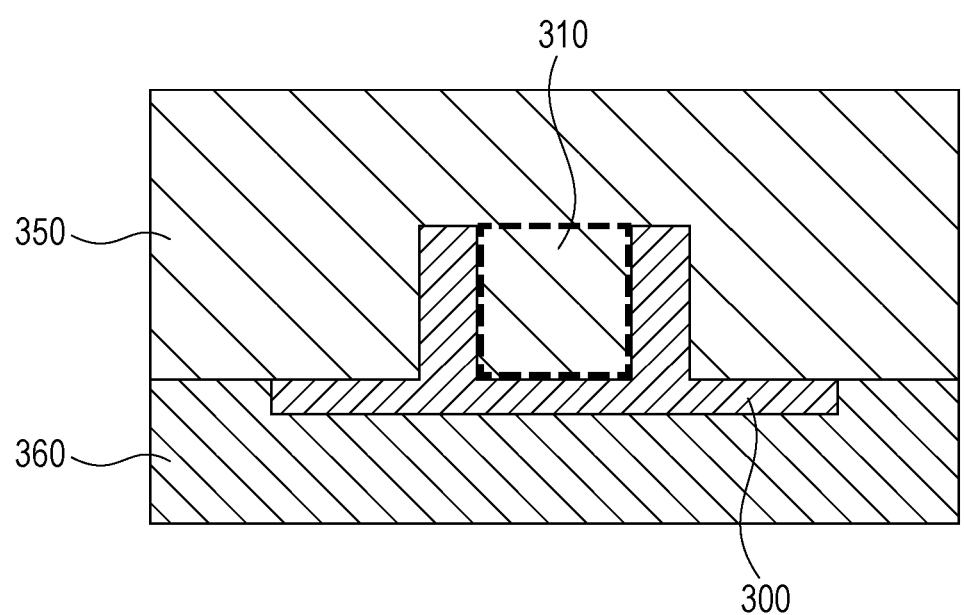

FIGS. 3A and 3B illustrate a process example according to the exemplary embodiment.

The example in FIG. 3A illustrates a heat reservoir site 310 in a part 300. That is, the heat reservoir site 310 includes pouch-shaped portions, and the pouch-shaped portions in this example are deep.

The example in FIG. 3B illustrates an example of a sectional surface of the part 300 which is molded using molds 350 and 360. In this case, heat tends to be accumulated in a site surrounded by a resin of the part 300, and thus the site serves as the heat reservoir site 310.

FIG. 4 is a flowchart illustrating a process example according to the exemplary embodiment.

In step S402, the drawing information receiving module 110 receives drawing information on a mold.

In step S404, the pouch-shaped portion extraction module 120 extracts a pouch-shaped portion. The process in step S404 will be discussed in detail later using the flowchart illustrated in the example of FIG. 5.

In step S406, the heat reservoir coefficient calculation module 130 calculates a heat reservoir coefficient.

In step S408, it is determined whether or not "heat reservoir coefficient> threshold" holds true. In the case where "heat reservoir coefficient> threshold" holds true, the process proceeds to step S410. Otherwise, the process proceeds to step S414.

In step S410, the molding time calculation module 140 calculates a molding time.

In step S412, the presentation module 150 presents the heat reservoir site and the molding time.

In step S414, it is determined whether or not processes for pouch-shaped portions to be targeted are finished. In the case where such processes are finished, the process is ended (step S499). Otherwise, the process returns to step S406.

Figure 5:
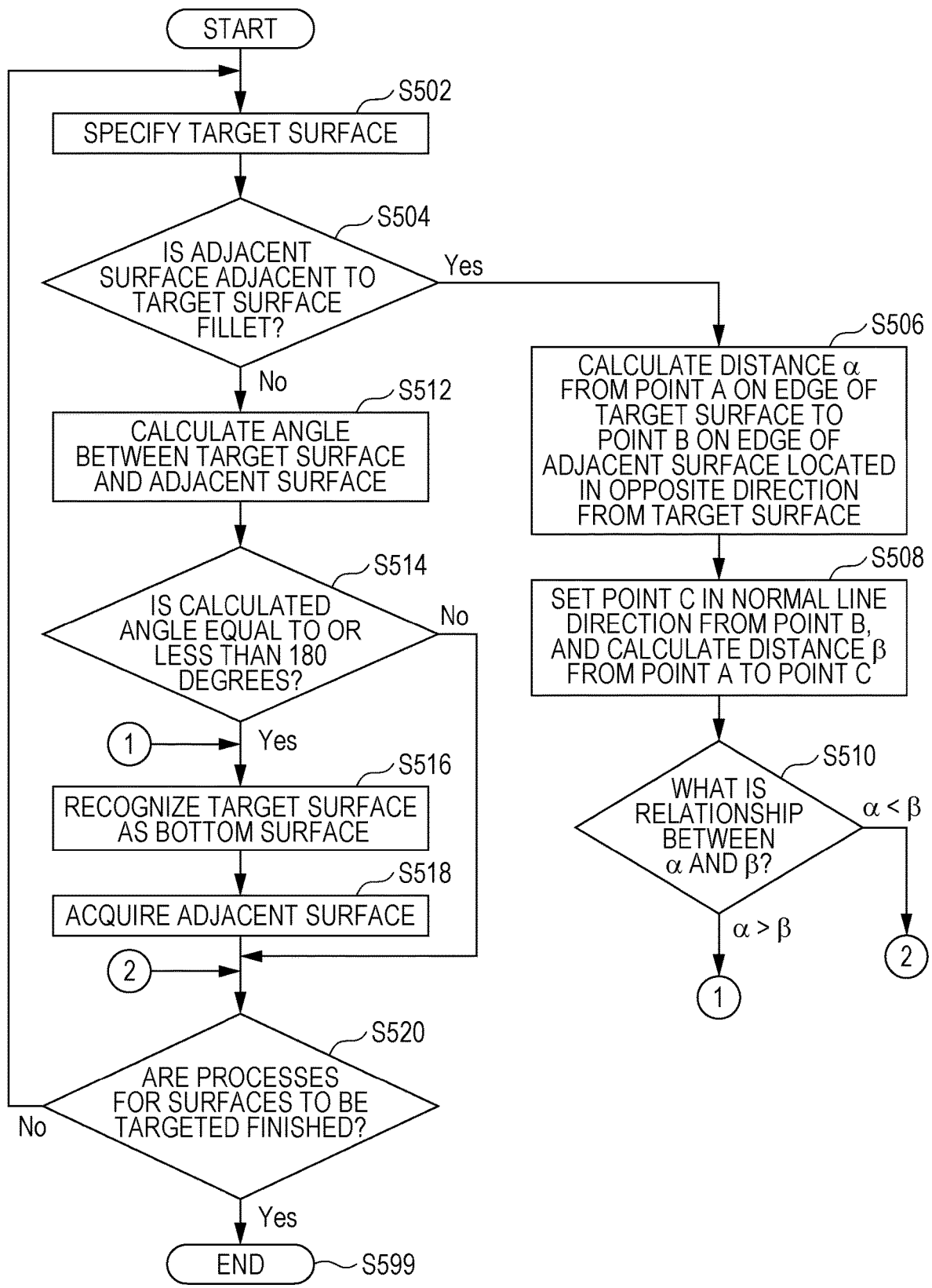
FIG. 5 is a flowchart illustrating a process example according to the exemplary embodiment.

FIG. 5 is a flowchart illustrating a process example according to the exemplary embodiment.

In step S502, a target surface is specified. For example, the target surface may be all the surfaces included in the drawing information.

In step S504, it is determined whether or not an adjacent surface that is adjacent to the target surface is a fillet (curved surface). In the case where the adjacent surface is a fillet, the process proceeds to step S506. Otherwise (in the case where the adjacent surface is a flat surface), the process proceeds to step S512.

In step S506, a distance $\alpha$ from a point A on an edge of the target surface to a point B on an edge of the adjacent surface which is located in the opposite direction from the target surface is calculated.

In step S508, a point C that is in the normal line direction from the point B is set, and a distance $\beta$ from the point A to the point C is calculated. The distance from the point B to the point C may be any distance.

In step S510, the relationship between $\alpha$ and $\beta$ is determined. In the case where "$\alpha>\beta$" holds true, the process proceeds to step S516 (it is determined that the target surface is a pouch-shaped portion). In the case where "$\alpha>\beta$" does not hold true, the process proceeds to step S520 (it is determined that the target surface is not a pouch-shaped portion).

In step S512, an angle between the target surface and the adjacent surface is calculated.

In step S514, it is determined whether or not the calculated angle is equal to or less than 180 degrees. In the case where the calculated angle is equal to or less than 180 degrees, the process proceeds to step S516 (it is determined that the target surface is a pouch-shaped portion). Otherwise, the process proceeds to step S520 (it is determined that the target surface is not a pouch-shaped portion).

In step S516, the target surface is recognized as a bottom surface.

In step S518, the adjacent surface is acquired. At this time, the bottom surface and the adjacent surface have been acquired, and thus a pouch-shaped portion has been specified.

In step S520, it is determined whether or not processes for surfaces to be targeted are finished. In the case where such processes are finished, the process is ended (step S599). Otherwise, the process returns to step S502.

Figure 6A:
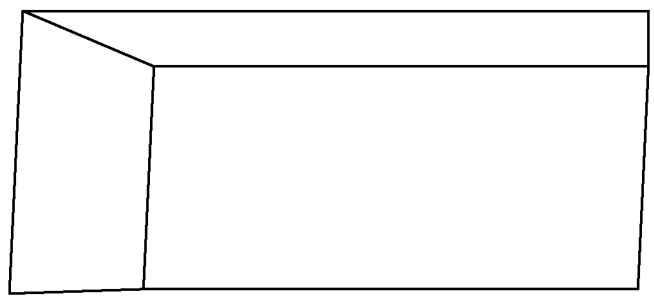
FIGS. 6A to 6C illustrate a process example according to the exemplary embodiment.
Figure 6B:
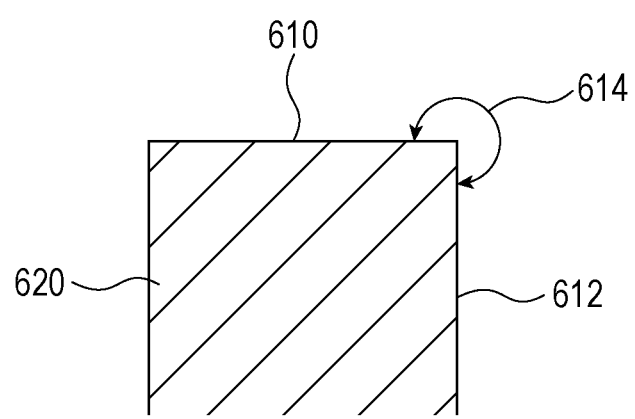
Figure 6C:
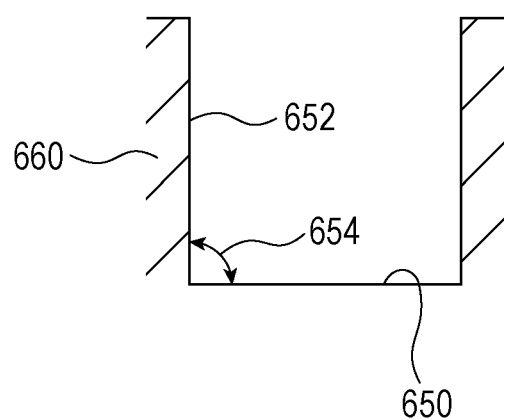

FIGS. 6A to 6C illustrate a process example according to the exemplary embodiment. The drawings illustrate a process example for a case where the determination result in step S504 of the flowchart illustrated in the example of FIG. 5 is "No". That is, the adjacent surface which is adjacent to the bottom surface is a flat surface as illustrated in the example of FIG. 6A.

A surface that makes an angle of 180 degrees or less with the adjacent surface is extracted as the bottom surface, and a portion formed by the bottom surface and the adjacent surface is extracted as a pouch-shaped portion.

In the example of FIG. 6B, an angle 614 made by a target surface 610 and an adjacent surface 612 of a mold 620 is calculated in step S512. In this case, the angle 614 is 270 degrees, and is not equal to or less than 180 degrees. Thus, it is determined in step S514 that this site is not a pouch-shaped portion. A site in a so-called open shape and that includes at least one angle that is not equal to or less than 180 degrees is determined not to be a pouch-shaped portion.

In the example of FIG. 6C, an angle 654 made by a target surface 650 and an adjacent surface 652 of a mold 660 is calculated in step S512. In this case, the angle 654 is 90 degrees, and is equal to or less than 180 degrees. Thus, it is determined in step S514 that this site is a pouch-shaped portion. A site in a so-called closed shape and in which all the angles between the target surface and the adjacent surface are equal to or less than 180 degrees is determined to be a pouch-shaped portion.

Figure 7A:
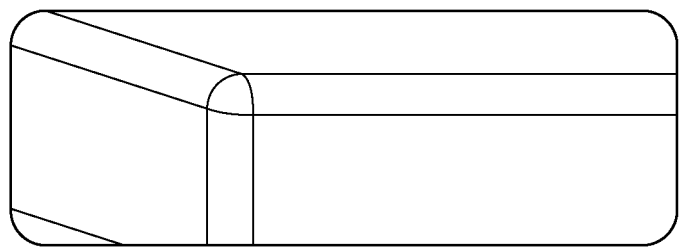
FIGS. 7A to 7C illustrate a process example according to the exemplary embodiment.
Figure 7B:
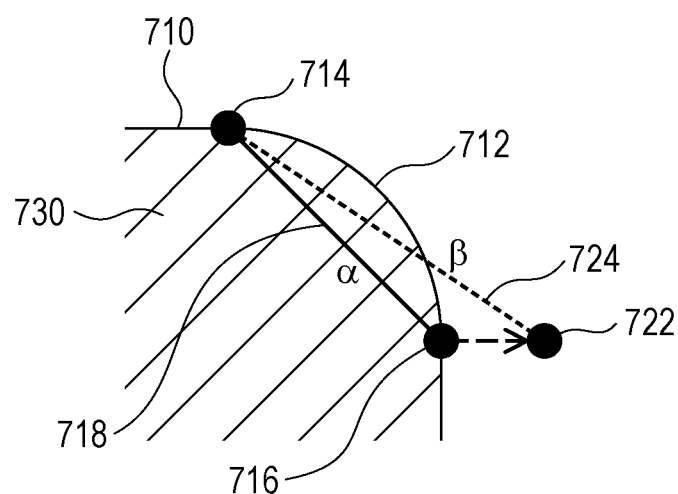

FIGS. 7A and 7B illustrate a process example according to the exemplary embodiment. The drawings illustrate a process example for a case where the determination result in step S504 of the flowchart illustrated in the example of FIG. 5 is "Yes". That is, the drawings illustrate an example of a case where the adjacent surface which is adjacent to the bottom surface is not a flat surface (but a fillet) as illustrated in the example of FIG. 7A.

A pouch-shaped portion is extracted using the distance between a point on the boundary between the bottom surface and the adjacent surface and a point on the boundary with the adjacent surface which is located in the opposite direction from the bottom surface.

In the example of FIG. 7B, in step S506, a distance $\alpha$718 in a mold 730 from a point 714 on an edge of a target surface 710 to a point 716 on an edge of an adjacent surface 712 located in the opposite direction from the target surface 710 is calculated. The point "located in the opposite direction from the target surface 710" refers to a point on a side of the adjacent surface 712 that is not a side on which the target surface 710 and the adjacent surface 712 contact each other. In the example of FIG. 7B, the point 716 on an edge corresponds to such a point.

In step S508, a point 722 on a normal line that is in the normal line direction from the point 716 on an edge is set, and a distance β724 from the point 714 on an edge to the point 722 on the normal line is calculated. The "normal line direction from the point 716 on an edge" refers to the direction of the normal line at the point 716 on an edge and that is not the direction into the mold 730.

Next, since the relationship "distance α718<distance β724" holds true in step S510, it is determined that the site is not a pouch-shaped portion.

Figure 7C:
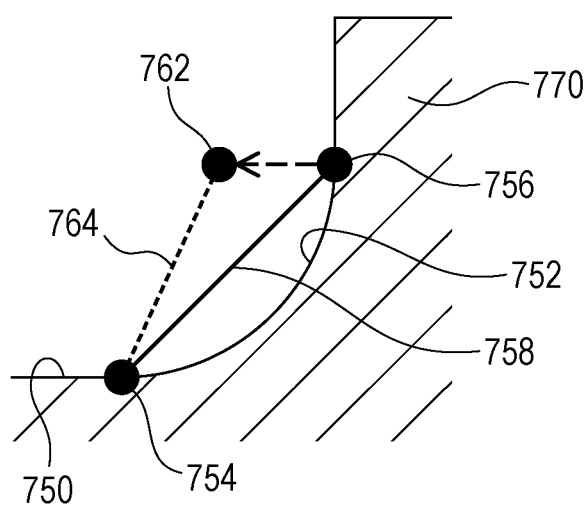

In the example of FIG. 7C, in step S506, a distance α758 in a mold 770 from a point 754 on an edge of a target surface 750 to a point 756 on an edge of an adjacent surface 752 located in the opposite direction from the target surface 750 is calculated. The point "located in the opposite direction from the target surface 750" refers to a point on a side of the adjacent surface 752 that is not a side on which the target surface 750 and the adjacent surface 752 contact each other. In the example of FIG. 7C, the point 756 on an edge corresponds to such a point.

In step S508, a point 762 on a normal line that is in the normal line direction from the point 756 on an edge is set, and a distance β764 from the point 754 on an edge to the point 762 on the normal line is calculated. The "normal line direction from the point 756 on an edge" refers to the direction of the normal line at the point 756 on an edge and that is not the direction into the mold 770.

Next, since the relationship "distance α758> distance β764" holds true in step S510, it is determined that the site is not a pouch-shaped portion.

That is, the distance (α) to an edge of the adjacent surface and the distance (β) to a point in the normal line direction from the edge are compared with each other, and the site is determined as a pouch-shaped portion if β is the smaller.

Figure 8:
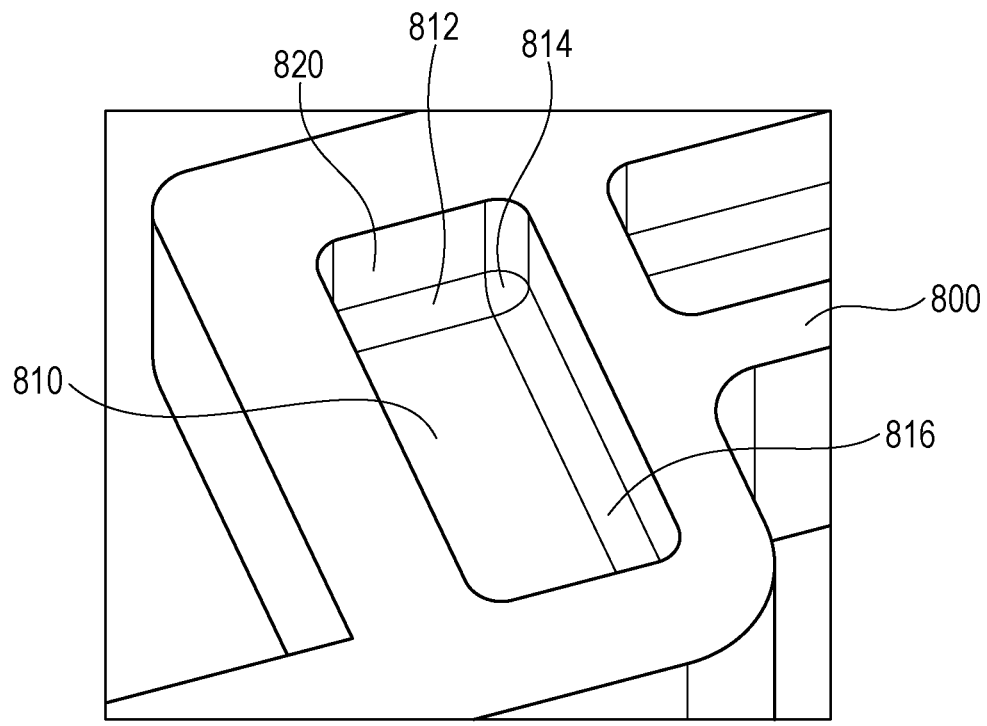
FIG. 8 illustrates a process example according to the exemplary embodiment.

FIG. 8 illustrates a process example according to the exemplary embodiment.

Through the process in the flowchart illustrated in the example of FIG. 5, a surface 810 which is the bottom surface, surfaces 812, 814, 816, etc. (some surfaces are not illustrated in FIG. 8) which are fillets that are adjacent to the surface 810, and a surface 820 that is adjacent to the surface 812 etc. (surfaces that are adjacent to the surfaces 812, 814, and 816; some surfaces are not illustrated in FIG. 8) are acquired in a part 800. In the case where the surface 812 is determined as the target surface, the surface 820 is also acquired as a surface that forms a pouch-shaped portion (with the surface 812 serving as the bottom surface and with the surface 820 serving as the adjacent surface) in step S518. Thus, the surfaces 810, 812, 814, 816, 820, etc. are acquired as surfaces that form a pouch-shaped portion. The total area of such surfaces is determined as a resin contact area a.

A method of calculating a heat reservoir coefficient will be described next.

Figure 9:
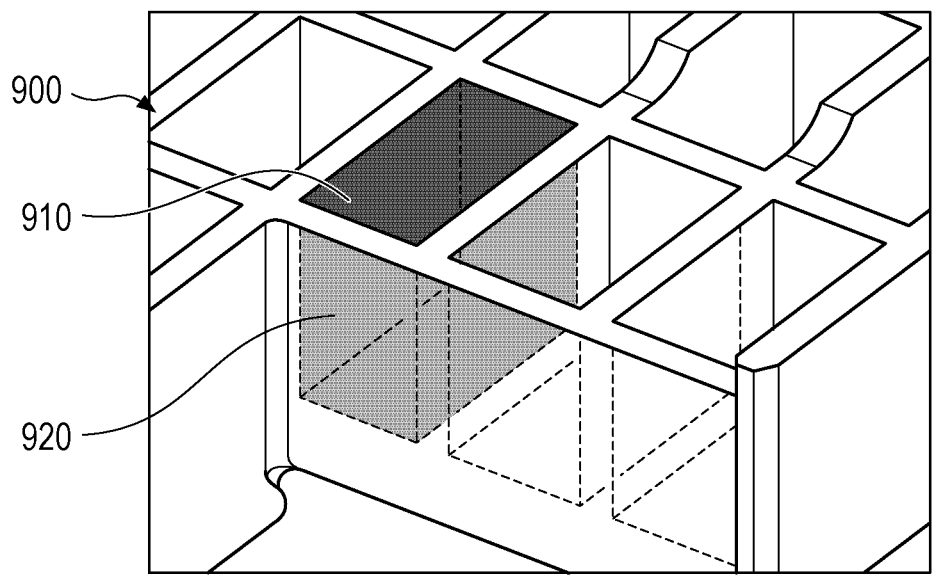
FIG. 9 illustrates a process example according to the exemplary embodiment.

FIG. 9 illustrates a process example according to the exemplary embodiment. In a mold 900, a pouch-shaped portion is divided into a heat radiation sectional surface 910 and a resin welding surface 920. The heat radiation sectional surface 910 mainly serves as a surface that allows a resin portion to be cooled, and the resin welding surface 920 serves as a portion that stores heat.

Figure 10A:
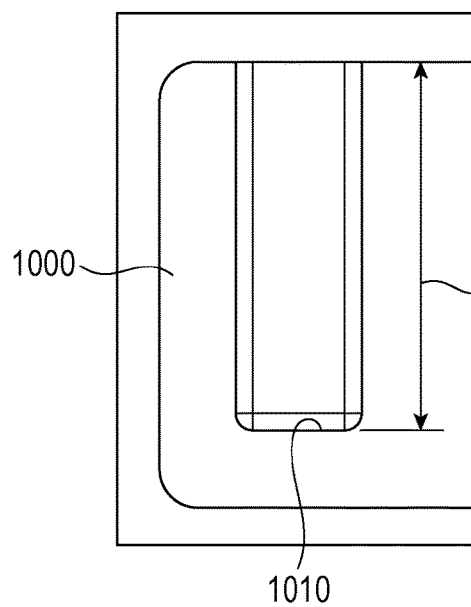
FIGS. 10A and 10B illustrate a process example according to the exemplary embodiment.
Figure 10B:
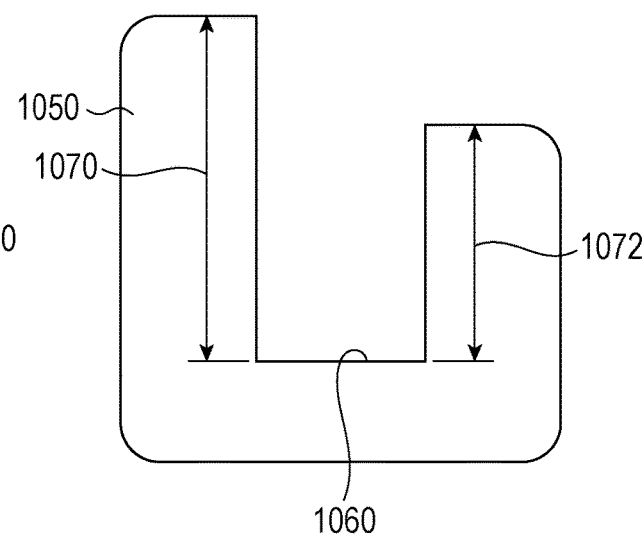

FIGS. 10A and 10B illustrate a process example according to the exemplary embodiment.

In the example of FIG. 10A, a height 1020 of a pouch-shaped portion from a bottom surface 1010 in a mold 1000 is measured. In the example of FIG. 10A, there is one height 1020. As illustrated in the example of FIG. 10B, however, there are occasionally plural heights.

In the example of FIG. 10B, heights 1070 and 1072 of a pouch-shaped portion from a bottom surface 1060 in a mold 1050 are measured. The heights are compared with each other, and the smaller height is determined as the height of the pouch-shaped portion. In this example, the height 1072 is determined as the height of the pouch-shaped portion.

Figure 11A:
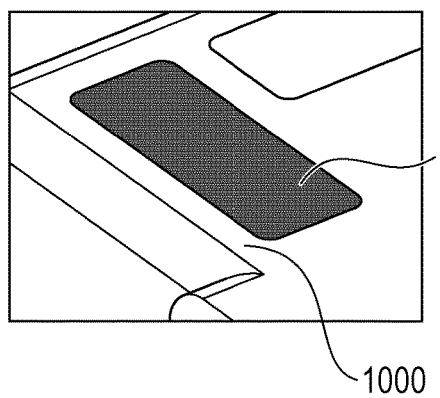
FIGS. 11A and 11B illustrate a process example according to the exemplary embodiment.
Figure 11B:
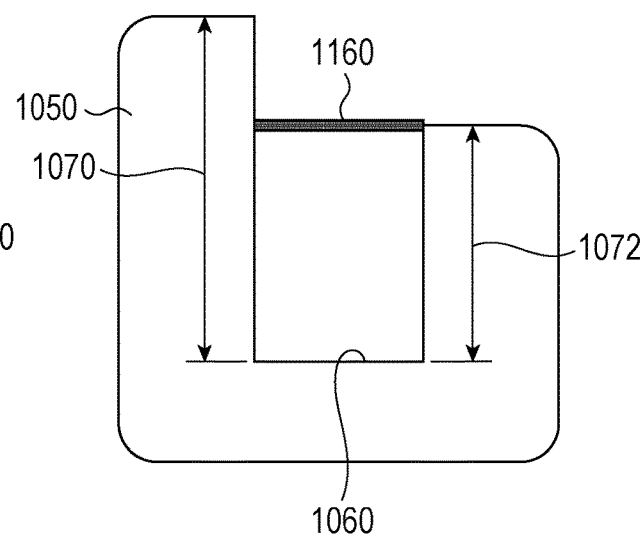

FIGS. 11A and 11B illustrate a process example according to the exemplary embodiment.

A surface that forms the pouch-shaped portion (e.g. a sectional surface that is perpendicular to the draft direction) is set from the smallest height, and determined as a heat radiation sectional surface (an example of the sectional area of the pouch-shaped portion). The area of the heat radiation sectional surface is defined as a heat radiation sectional area b. In the example of FIG. 11A, a heat radiation sectional surface 1110 of a mold 1000 is determined. In the example of FIG. 11B, a heat radiation sectional surface 1160 of a mold 1050 is determined.

The heat reservoir coefficient is defined by the following formula (1):

$$\text{Heat reservoir coefficient} = \text{resin contact area } a/\text{heat radiation sectional area } b \quad \text{(formula (1))}$$

The formula (1) indicates the difficulty of heat release. A larger value indicates higher difficulty of heat release. The resin contact area a is the total area of the surfaces which form the pouch-shaped portion discussed earlier, which include the bottom surface and the adjacent surfaces.

The following formula (2) may be adopted as another formula:

$$\text{Heat reservoir coefficient} = \text{volume of pouch-shaped portion}/\text{heat radiation sectional area } b \quad \text{(formula (2))}$$

The formula (2) indicates the difficulty of heat release. A larger value indicates higher difficulty of heat release. The "resin contact area a" in the formula (1) has been replaced with the "volume of pouch-shaped portion".

The heat reservoir coefficient and the predetermined threshold are compared with each other to determine whether or not the pouch-shaped portion is a heat reservoir. For example, the pouch-shaped portion is determined to be a heat reservoir in the case where the heat reservoir coefficient is equal to or more than the predetermined threshold, and the pouch-shaped portion is determined not to be a heat reservoir in the case where the heat reservoir coefficient is not equal to or more than the predetermined threshold.

A molding time is calculated using the heat reservoir coefficient. For example, a formula that includes the heat reservoir coefficient as a variable (e.g. a formula in which the molding time is directly proportional to the heat reservoir coefficient or the like) may be used, or a table in which the heat reservoir coefficient and the molding time are correlated with each other may be used.

In the case where the molding time is equal to or more than the predetermined threshold, further, a piece of advice that suggests shortening the molding time may be presented. For example, a piece of advice that suggests reducing the resin contact area, reducing the depth (height) of the pouch-shaped portion, lowering a rib, etc. may be presented.

Figure 12:
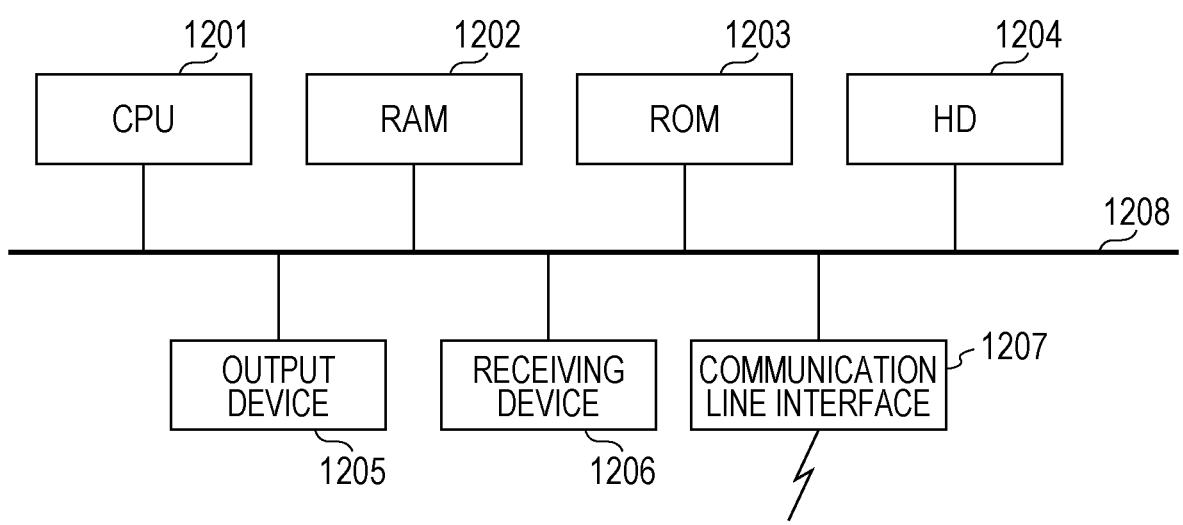
FIG. 12 is a block diagram illustrating a hardware configuration example of a computer that implements the exemplary embodiment.

As illustrated in FIG. 12, the hardware configuration of a computer that executes a program as the exemplary embodiment is a common computer, specifically a computer that may serve as a personal computer, a server, or the like. That is, as a specific example, the computer includes a CPU 1201 as a processing section (computation section) and a RAM 1202, a read only memory (ROM) 1203, and a hard disk (HD) 1204 as storage devices. The HD 1204 may be a hard disk drive or a solid state drive (SSD), for example. The computer is composed of: the CPU 1201 which executes programs such as the drawing information receiving module 110, the pouch-shaped portion extraction module 120, the heat reservoir coefficient calculation module 130, the molding time calculation module 140, and the presentation module 150; the RAM 1202 which stores the programs and data; the ROM 1203 which stores a program for starting the computer etc.; the HD 1204 which is an auxiliary storage device (which may be a flash memory or the like) that stores CAD data etc.; a receiving device 1206 that receives data on the basis of an operation (including motion, a voice, a line of sight, etc.) performed by the user on a keyboard, a mouse, a touch screen, a microphone, a camera (including a line-of-sight detection camera etc.), or the like; an output device 1205 such as a cathode ray tube (CRT), a liquid crystal display, a speaker, etc.; a communication line interface 1207 for connection with a communication network such as a network interface card; and a bus 1208 that connects such parts for data exchange. Plural computers may be connected to each other through a network.

The exemplary embodiment discussed earlier implemented by a computer program is implemented by causing a system of the hardware configuration described above to read the computer program as software and causing the software and hardware resources to cooperate with each other.

The hardware configuration illustrated in FIG. 12 indicates one configuration example. The exemplary embodiment is not limited to the configuration illustrated in FIG. 12, and may have any configuration that may execute the modules described in relation to the exemplary embodiment. For example, some of the modules may be constituted by dedicated hardware (such as an application specific integrated circuit (ASIC), for example), some of the modules may be provided in an external system and connected through a communication line, and further plural systems illustrated in FIG. 12 may be connected to each other through a communication line to cooperate with each other. In addition, and in particular, the system may be incorporated into not only a personal computer but also a portable information communication device (including a cellular phone, a smartphone, a mobile device, a wearable computer, etc.), an information appliance, a robot, a copier, a facsimile, a scanner, a printer, a multi-function device (image processing device that has the functions of two or more of a scanner, a printer, a copier, a facsimile, etc.), etc.

The program described above may be provided as stored in a storage medium, or the program may be provided by a communication unit. In this case, the program described above may be considered as an invention of a "computer-readable storage medium that stores a program", for example.

The term "computer-readable storage medium that stores a program" refers to a computer-readable storage medium that stores a program and that is used to install, execute, and distribute the program.

Examples of the storage medium include digital versatile discs (DVDs) that conform to standards prescribed by the DVD Forum "DVD-R, DVD-RW, DVD-RAM, etc.", DVDs that conform to standards prescribed by the DVD+RW Alliance "DVD+R, DVD+RW, etc.", compact discs (CDs) such as read-only memory (CD-ROM), CD recordable (CD-R), and CD rewritable (CD-RW), Blu-ray (registered trademark) discs, magneto-optical (MO) disks, flexible disks (FDs), magnetic tapes, hard disks, read-only memories (ROMs), electrically erasable reprogrammable read-only memories (EEPROMs (registered trademark)), flash memories, random-access memories (RAMs), and SD (Secure Digital) memory cards.

A part or all of the program described above may be saved, distributed, etc. as stored in the storage medium. In addition, a part or all of the program may be transferred through communication using a transfer medium such as a wired network, a wireless communication network, or a combination thereof used as a local area network (LAN), a metropolitan area network (MAN), a wide area network (WAN), the Internet, an intranet, an extranet, or the like, or may be carried over a carrier wave.

Further, the program described above may be a part or all of another program, or may be stored in a storage medium together with another program. Alternatively, the program may be stored as divided in plural storage media. In addition, the program may be compressed, encrypted, or stored in any form as long as the program may be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory;
a display; and
a processor communicatively coupled to the memory and the display, wherein the processor is configured to:
extract a pouch-shaped portion from drawing information on a mold;
extract a heat reservoir site from which heat is accumulated from the pouch-shaped portion; and
present the heat reservoir site or a molding time as a result of a process performed by the processor,
wherein the molding time is a value calculated using a coefficient calculated using a sectional area of the pouch-shaped portion and an area of the adjacent surface or using the sectional area of the pouch-shaped portion and a volume of the pouch-shaped portion,
wherein based on the molding time, changing a shape of the pouch-shaped portion is presented on the mold.

2. The information processing apparatus according to claim 1,
wherein the processor performs a first when the adjacent surface—is a flat surface and performs a second process when the adjacent surface is not a flat surface.

3. The information processing apparatus according to claim 2,
wherein, in a case where the adjacent surface is a flat surface, the processor extracts a surface that makes an angle of 180 degrees or less with the adjacent surface as the bottom surface, and extracts a portion formed by the bottom surface and the adjacent surface as the pouch-shaped portion.

4. The information processing apparatus according to claim 2,
wherein, in a case where the adjacent surface is not a flat surface, the processor the pouch-shaped portion using a distance between a first point on a boundary between the bottom surface and the adjacent surface and a second point on a boundary with the adjacent surface located in an opposite direction from the bottom surface, and
wherein the second point is a location on a side of the adjacent surface that is not a side on which the bottom surface and the adjacent surface are in contact.

5. The information processing apparatus according to claim 1,
wherein the processor extracts the heat reservoir site on a basis of a coefficient calculated using the sectional area of the pouch-shaped portion and the area of the adjacent surface or using the sectional area of the pouch-shaped portion and the volume of the pouch-shaped portion.

6. The information processing apparatus according to claim 5,
wherein the sectional area is an area of a sectional surface of the pouch-shaped portion that is perpendicular to a draft direction at a smallest height of the pouch shaped portion.

* * * * *